US012664939B2

(12) United States Patent
Feng et al.

(10) Patent No.: US 12,664,939 B2
(45) Date of Patent: Jun. 23, 2026

(54) DISPLAY PROCESSING METHOD, DEVICE AND DISPLAY EQUIPMENT

(71) Applicants: Hefei BOE Joint Technology Co., Ltd., Hefei (CN); BOE TECHNOLOGY GROUP CO., LTD., Beijing (CN)

(72) Inventors: Xuehuan Feng, Beijing (CN); Yongqian Li, Beijing (CN)

(73) Assignees: Hefei BOE Joint Technology Co., Ltd., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/994,723

(22) PCT Filed: May 14, 2024

(86) PCT No.: PCT/CN2024/093061

§ 371 (c)(1),
(2) Date: Jan. 15, 2025

(87) PCT Pub. No.: WO2025/001559

PCT Pub. Date: Jan. 2, 2025

(65) Prior Publication Data

US 2026/0018121 A1 Jan. 15, 2026

(30) Foreign Application Priority Data

Jun. 25, 2023 (CN) ......................... 202310757728.8

(51) Int. Cl.
*G09G 3/3233* (2016.01)

(52) U.S. Cl.
CPC ... *G09G 3/3233* (2013.01); *G09G 2300/0452* (2013.01); *G09G 2300/0465* (2013.01);
(Continued)

(58) Field of Classification Search
CPC ......... G09G 3/3233; G09G 2300/0452; G09G 2300/0465; G09G 2300/0842;
(Continued)

(56) References Cited

U.S. PATENT DOCUMENTS

| | | | | |
|---|---|---|---|---|
| 8,994,619 B2 * | 3/2015 | Jeong | G09G 3/3233 | 345/82 |
| 9,014,327 B2 * | 4/2015 | Xu | G09G 3/3648 | 377/79 |

(Continued)

FOREIGN PATENT DOCUMENTS

| | | |
|---|---|---|
| CN | 100376940 C | 3/2008 |
| CN | 104809986 A | 7/2015 |

(Continued)

OTHER PUBLICATIONS

Office Action dated Dec. 31, 2025, issued in counterpart CN Application No. 202310757728.8, with English translation. (15 pages).

*Primary Examiner* — Jose R Soto Lopez
(74) *Attorney, Agent, or Firm* — WHDA, LLP

(57) ABSTRACT

A display processing method, a device and a display equipment are provided. The display processing device is applied to a display device, and the display area of the display device includes color sub-pixels and white sub-pixels. The device includes: an acquisition module, which is configured to acquire a first value of at least one first parameter of a preset area of the display area when the display device is in a video playback state, and the first parameter corresponds to a driving transistor of a pixel driving circuit in the preset area, and the value of the first parameter is proportional to the threshold voltage of the corresponding driving transistor; after a first preset time period, the second value of each first parameter is acquired; a determination module.

20 Claims, 10 Drawing Sheets

(52) U.S. Cl.
CPC ............... *G09G 2300/0842* (2013.01); *G09G 2310/0286* (2013.01); *G09G 2320/0257* (2013.01); *G09G 2320/0626* (2013.01); *G09G 2320/103* (2013.01); *G09G 2330/021* (2013.01)

(58) Field of Classification Search
CPC ... G09G 2310/0286; G09G 2320/0257; G09G 2320/0626; G09G 2320/103; G09G 2330/021; G09G 3/3225; G09G 2320/041; G09G 2320/0686
See application file for complete search history.

(56) References Cited

U.S. PATENT DOCUMENTS

| | | | | |
|---|---|---|---|---|
| 12,118,949 | B2 * | 10/2024 | Seo | G09G 3/3291 |
| 2010/0134468 | A1 * | 6/2010 | Ogura | G09G 3/3291 345/211 |
| 2010/0134469 | A1 * | 6/2010 | Ogura | G09G 3/3291 345/211 |
| 2010/0134475 | A1 * | 6/2010 | Ogura | G09G 3/3291 345/213 |
| 2010/0134482 | A1 * | 6/2010 | Ogura | G09G 3/3291 345/76 |
| 2010/0245343 | A1 * | 9/2010 | Takei | G09G 3/3241 345/214 |
| 2013/0215360 | A1 * | 8/2013 | Pollack | G09G 5/02 349/61 |
| 2015/0091950 | A1 * | 4/2015 | Park | G09G 3/3208 345/83 |
| 2017/0186369 | A1 * | 6/2017 | Hayashi | G09G 3/3233 |
| 2018/0218703 | A1 * | 8/2018 | Lee | G09G 3/3648 |
| 2019/0259325 | A1 | 8/2019 | Chaji et al. | |
| 2019/0305056 | A1 * | 10/2019 | Sonoda | G09G 5/363 |
| 2019/0348006 | A1 * | 11/2019 | Arai | G02F 1/13318 |
| 2020/0098318 | A1 * | 3/2020 | Liu | G09G 3/3291 |
| 2022/0108635 | A1 * | 4/2022 | Park | G09F 9/301 |
| 2023/0043902 | A1 * | 2/2023 | Hong | G09G 3/3233 |
| 2023/0068177 | A1 * | 3/2023 | Shimoshikiryoh | G02F 1/13306 |
| 2024/0038126 | A1 * | 2/2024 | Sung | G09G 3/3233 |
| 2024/0257704 | A1 * | 8/2024 | Lee | H10K 59/1213 |
| 2025/0201170 | A1 * | 6/2025 | Liu | G09G 3/3233 |

FOREIGN PATENT DOCUMENTS

| | | | |
|---|---|---|---|
| CN | 106251810 | A | 12/2016 |
| CN | 108417169 | A | 8/2018 |
| CN | 109036268 | A | 12/2018 |
| CN | 210575036 | U | 5/2020 |
| CN | 113611250 | A | 11/2021 |
| CN | 114420046 | A | 4/2022 |
| CN | 115223501 | A | 10/2022 |
| CN | 116959375 | A | 10/2023 |
| KR | 20190032807 | A | 3/2019 |
| KR | 20190034854 | A | 4/2019 |
| KR | 20220081499 | A | 6/2022 |

* cited by examiner

| | | | | |
|---|---|---|---|---|
| A | | | | B |
| | | | | |
| | | | | |
| | | | | |
| C | | | | D |

FIG.5

| | | | | |
|---|---|---|---|---|
| 150 | 160 | 162 | 154 | 180 |
| 140 | 158 | 170 | 160 | 150 |
| 148 | 150 | 170 | 160 | 145 |
| 155 | 175 | 163 | 159 | 168 |
| 150 | 170 | 160 | 160 | 148 |

FIG.6

| | | | | |
|---|---|---|---|---|
| 190 | 160 | 162 | 154 | 250 |
| 145 | 163 | 175 | 163 | 158 |
| 158 | 157 | 176 | 169 | 153 |
| 165 | 185 | 169 | 169 | 179 |
| 165 | 185 | 169 | 172 | 159 |

FIG.7

DISPLAY PROCESSING METHOD, DEVICE AND DISPLAY EQUIPMENT

CROSS REFERENCE OF RELATED APPLICATION

The present disclosure is the U.S. national phase of PCT Application PCT/CN2024/093061 filed on May 14, 2024, which claims a priority of Chinese patent disclosure No. 202310757728.8 filed on Jun. 25, 2023, which is incorporated herein by reference in its entirety.

TECHNICAL FIELD

The present disclosure relates to the field of display technology, and in particular to a display processing method, device and display equipment.

BACKGROUND

OLED (Organic Light-Emitting Diode) display devices have been listed as the next generation display technology with great development prospects due to their advantages such as thinness, lightness, wide viewing angle, active light emission, continuously adjustable light color, low cost, fast response speed, low energy consumption, low driving voltage, wide operating temperature range, simple production process, high light emission efficiency and flexible display.

In the related art, an OLED display device includes color sub-pixels and white sub-pixels. The color sub-pixels are realized by setting a color film layer on the light-emitting side of the white sub-pixels. Compared with the white sub-pixels, the color sub-pixels have a larger brightness loss. In order to achieve the preset brightness, the color sub-pixels consume more power. In some always-on areas such as the logo area, the high power consumption of the color sub-pixels causes the temperature of the area to rise rapidly, and the temperature difference with other areas is large, resulting in obvious afterimages.

SUMMARY

The present disclosure is to provide a display processing method, device and display device, which can eliminate the afterimage of the display device.

To solve the above technical problems, the embodiments of the present disclosure provide the following technical solutions:

In one aspect, a display processing device is provided, which is applied to a display device, wherein a display area of the display device includes color sub-pixels and white sub-pixels, and the device includes:

- an acquisition module, configured to acquire, when the display device is in a video playback state, a first value of at least one first parameter of a preset area of the display area, wherein the first parameter corresponds to a driving transistor of a pixel driving circuit of the preset area, and the value of the first parameter is proportional to a threshold voltage of the corresponding driving transistor; and acquire a second value of each first parameter after a first preset time period;
- a determination module, configured to determine a target area according to a difference between the second value and the first value, wherein the difference of at least part of the first parameters of the target area is greater than a first preset threshold;

- a processing module, configured to reduce the brightness of the color sub-pixels in the target area.

In some embodiments, the processing module is further configured to increase the brightness of the white sub-pixels in the target area while reducing the brightness of the color sub-pixels in the target area.

In some embodiments, the target area satisfies at least one of the following: all first parameters in the target area are greater than a first preset threshold;

- a difference of some first parameters in the target area is greater than a first preset threshold;
- all first parameters in the target area are greater than a first preset threshold.

In some embodiments, the pixel driving circuit includes a data writing circuit, a driving circuit, an external control compensation circuit and a storage capacitor, the data writing circuit includes a first transistor, a gate of the first transistor is connected to a first gate line, a first electrode of the first transistor is connected to a data line, and a second electrode of the first transistor is connected to a first node;

- an external compensation control circuit comprises a second transistor, a gate of the second transistor is connected to a second gate line, a first electrode of the second transistor is connected to a compensation control line, and a second electrode of the second transistor is connected to a second node;
- the driving circuit comprises a driving transistor, a gate of the driving transistor is connected to the first node, a first electrode of the driving transistor is connected to a high level signal line, and a second electrode of the driving transistor is connected to the second node;
- the first plate of the storage capacitor is connected to the first node, and the second plate of the storage capacitor is connected to the second node;
- the display stage of the display device includes four stages:

In the first stage, a high potential electrical signal is input to the first gate line and the second gate line;

In the second stage, a low potential electric signal is input to the first gate line, a high potential electric signal is input to the second gate line, and the potential of the electric signal input to the compensation control line is gradually increased;

In the third stage, a low potential electrical signal is input to the first gate line, a high potential electrical signal is input to the second gate line, and a high potential electrical signal is input to the compensation control line;

In the fourth stage, a high potential electrical signal is input to the first gate line and the second gate line, and a low potential electrical signal is input to the compensation control line;

- the acquisition module is specifically configured to acquire the voltage signal of the second node in the third stage, and convert the voltage signal into the value of the first parameter.

In some embodiments, the display area is divided into a plurality of sub-areas arranged in an array, and the preset area includes at least one of the sub-areas.

In some embodiments, the preset area includes four sub-areas located at the corners of the display area.

In some embodiments, the processing module is also configured to repeat the step of obtaining the difference after reducing the brightness of the colored sub-pixels of the target area, and restore the brightness of the colored sub-pixels of the target area when the difference is less than a second preset threshold forn consecutive times, where n is an integer greater than 2, and the second preset threshold is less than the first preset threshold.

In some embodiments, the processing module is also configured to reduce the brightness of the colored sub-pixels of the target area and increase the brightness of the white sub-pixels of the target area, and then after a second preset time period, reduce the brightness of the colored sub-pixels and/or white sub-pixels of the target area, and repeat the step of obtaining the difference, and restore the brightness of the colored sub-pixels and/or white sub-pixels of the target area when the difference is less than a second preset threshold value for n consecutive times, where n is an integer greater than 2, and the second preset threshold value is less than the first preset threshold value.

In some embodiments, the processing module is further configured to, after reducing the brightness of the colored sub-pixels of the target area and increasing the brightness of the white sub-pixels of the target area, cyclically execute the steps of reducing and increasing the brightness of the colored sub-pixels and/or white sub-pixels of the target area after a second preset time period, and repeat the step of obtaining the difference, and restore the brightness of the colored sub-pixels and/or white sub-pixels of the target area when the difference is less than a second preset threshold value for n consecutive times, where n is an integer greater than 2, and the second preset threshold value is less than the first preset threshold value.

The embodiment of the present disclosure also provides a display device, including the display processing apparatus as described above.

The present disclosure also provides a display processing method, which is applied to a display device, wherein a display area of the display device includes color sub-pixels and white sub-pixels, and the method includes:

- when the display device is in a video playback state, obtaining a first value of at least one first parameter of a preset area of the display area, wherein the first parameter corresponds to a driving transistor of a pixel driving circuit of the preset area, and the value of the first parameter is proportional to a threshold voltage of the corresponding driving transistor;
- after a first preset time period, obtaining a second value of each first parameter;
- determining a target area according to a difference between the second value and the first value, wherein the difference of at least part of the first parameters of the target area is greater than a first preset threshold;
- the brightness of the color sub-pixels in the target area is reduced.

In some embodiments, while reducing the brightness of the color sub-pixels in the target area, the method further includes:

- the brightness of the white sub-pixels in the target area is increased.

In some embodiments, the target area satisfies at least one of the following:

- all first parameters in the target area are greater than a first preset threshold;
- the difference of some first parameters in the target area is greater than a first preset threshold;
- all first parameters in the target area is greater than a first preset threshold.

In some embodiments, the pixel driving circuit includes a data writing circuit, a driving circuit, an external control compensation circuit and a storage capacitor, the data writing circuit includes a first transistor, a gate of the first transistor is connected to a first gate line, a first electrode of the first transistor is connected to a data line, and a second electrode of the first transistor is connected to a first node;

- the external compensation control circuit comprises a second transistor, a gate of the second transistor is connected to a second gate line, a first electrode of the second transistor is connected to a compensation control line, and a second electrode of the second transistor is connected to a second node;
- the driving circuit comprises a driving transistor, a gate of the driving transistor is connected to the first node, a first electrode of the driving transistor is connected to a high level signal line, and a second electrode of the driving transistor is connected to the second node;
- the first plate of the storage capacitor is connected to the first node, and the second plate of the storage capacitor is connected to the second node;
- the display stage of the display device includes four stages:

In the first stage, a high potential electrical signal is input to the first gate line and the second gate line;

In the second stage, a low potential electric signal is input to the first gate line, a high potential electric signal is input to the second gate line, and the potential of the electric signal input to the compensation control line is gradually increased;

In the third stage, a low potential electrical signal is input to the first gate line, a high potential electrical signal is input to the second gate line, and a high potential electrical signal is input to the compensation control line;

In the fourth stage, a high potential electrical signal is input to the first gate line and the second gate line, and a low potential electrical signal is input to the compensation control line;

- where the obtaining the value of at least one first parameter of the preset area of the display area includes:

In the third stage, a voltage signal of the second node is acquired, and the voltage signal is converted into a value of the first parameter.

In some embodiments, the display area is divided into a plurality of sub-areas arranged in an array, and the preset area includes at least one of the sub-areas.

In some embodiments, the preset area includes four sub-areas located at the comers of the display area.

In some embodiments, the length of the sub-region does not exceed one quarter of the length of the display region, and the width of the sub-region does not exceed one quarter of the width of the display region.

In some embodiments, after reducing the brightness of the color sub-pixels in the target area, the method further includes:

- repeating the step of obtaining the difference, and when the difference is less than a second preset threshold value for n consecutive times, restore the brightness of the color sub-pixel of the target area, where n is an integer greater than 2, and the second preset threshold value is less than the first preset threshold value.

In some embodiments, after reducing the brightness of the color sub-pixels in the target area and increasing the brightness of the white sub-pixels in the target area, the method further includes:

- after a second preset time period, the brightness of the colored sub-pixels and/or white sub-pixels of the target area is reduced, and the step of obtaining the difference is repeated; when the difference is less than a second preset threshold value for u consecutive times, the brightness of the colored sub-pixels and/or white sub-pixels of the target area is restored, where n is an integer greater than 2, and the second preset threshold value is less than the first preset threshold value.

In some embodiments, after reducing the brightness of the color sub-pixels in the target area and increasing the brightness of the white sub-pixels in the target area, the method further includes:

after a second preset time period, the steps of reducing and increasing the brightness of the colored sub-pixels and/or white sub-pixels of the target area are cyclically performed, and the step of obtaining the difference is repeated. When the difference is less than a second preset threshold value for n consecutive times, the brightness of the colored sub-pixels and/or white sub-pixels of the target area is restored, where n is an integer greater than 2, and the second preset threshold value is less than the first preset threshold value.

The embodiments of the present disclosure have the following beneficial effects:

In the above scheme, when the target area is in the display state for a long time, the value of the first parameter of the target area will change significantly. By detecting the value of the first parameter, it is possible to detect whether the target area is in the display state for a long time. If the target area is in the display state for a long time, the temperature difference between the target area and other areas will be relatively large, and afterimages are likely to appear. Therefore, the brightness of the color sub-pixels in the target area can be reduced, thereby reducing the power consumption and current density of the target area, narrowing the temperature difference between the target area and other areas, and eliminating afterimages.

BRIEF DESCRIPTION OF THE DRAWINGS

FIG. 5 is a schematic diagram of four sub-areas at the corner positions of a display area according to an embodiment of the present disclosure;

FIG. 6 is a schematic diagram of first values of multiple sub-regions according to an embodiment of the present disclosure;

FIG. 7 is a schematic diagram of second values of multiple sub-regions according to an embodiment of the present disclosure;

DETAILED DESCRIPTION

In order to make the technical problems, technical solutions and advantages to be solved by the embodiments of the present disclosure more clear, a detailed description will be given below with reference to the accompanying drawings and specific embodiments.

The embodiments of the present disclosure provide a display processing method, an apparatus and a display device, which can eliminate the afterimage of the display device.

Figure 1:
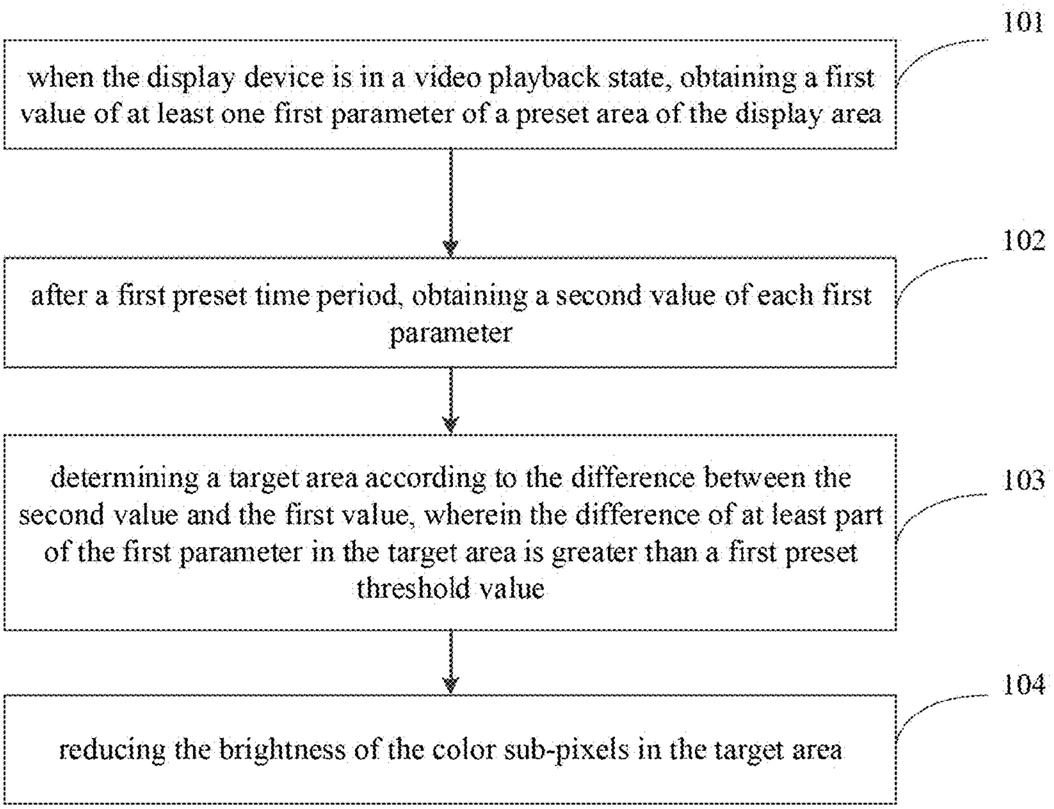
FIG. 1 is a schematic diagram of a flow chart of a display processing method according to an embodiment of the present disclosure.

Embodiment of the present disclosure provides a display processing method, which is applied to a display device, wherein a display area of the display device includes color sub-pixels and white sub-pixels. As shown in FIG. 1, the method includes:

Step 101: when the display device is in a video playback state, obtaining a first value of at least one first parameter of a preset area of the display area, wherein the first parameter corresponds to a driving transistor of a pixel driving circuit of the preset area, and the value of the first parameter is proportional to a threshold voltage of the corresponding driving transistor;

Specifically, the first parameter corresponds to the driving transistors of the pixel driving circuit in the preset area one by one, and each driving transistor has a first parameter.

Step 102: after a first preset time period, obtaining a second value of each first parameter;

Step 103: determining a target area according to the difference between the second value and the first value, wherein the difference of at least part of the first parameter in the target area is greater than a first preset threshold value, and the first preset threshold value can be set as required, and when the difference of the first parameter is greater than the first preset threshold value, a relatively large change occurs in the threshold voltage of the driving transistor;

Step 104: reducing the brightness of the color sub-pixels in the target area.

In this embodiment, the color sub-pixels may include a red sub-pixel, a green sub-pixel, and a blue sub-pixel, and the light emitted by the color sub-pixels can be mixed into white light.

In this embodiment, when the target area is in the display state for a long time, the value of the first parameter of the target area will change significantly. By detecting the value of the first parameter, it is possible to detect whether the target area is in the display state for a long time. If the target area is in the display state for a long time, the temperature difference between the target area and other areas will be relatively large, and afterimages are likely to appear. Therefore, the brightness of the color sub-pixels in the target area can be reduced, thereby reducing the power consumption and current density of the target area, narrowing the temperature difference between the target area and other areas, and eliminating afterimages.

In some embodiments, while reducing the brightness of the color sub-pixels in the target area, the method further includes:

Increase the brightness of the white sub-pixel in the target area. To ensure the overall brightness of the target area, while reducing the brightness of the color sub-pixels in the target area, it is also necessary to increase the brightness of the white sub-pixel in the target area accordingly, so that the human eye will not clearly perceive the brightness change of the target area.

Figure 2A:
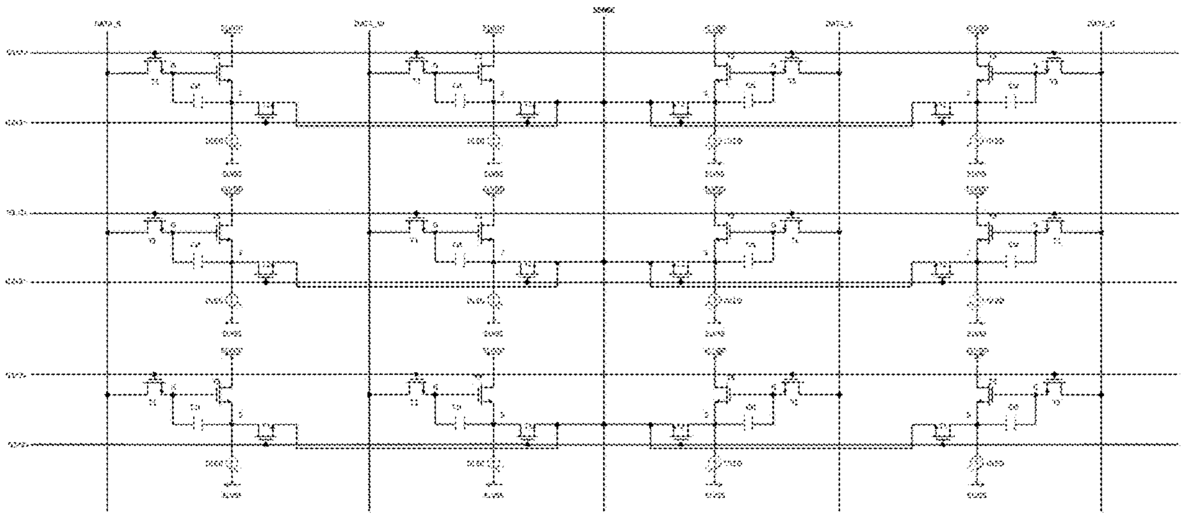
FIGS. 2*a* and 2*b* are schematic diagrams of a pixel driving circuit according to an embodiment of the present disclosure.
Figure 2B:
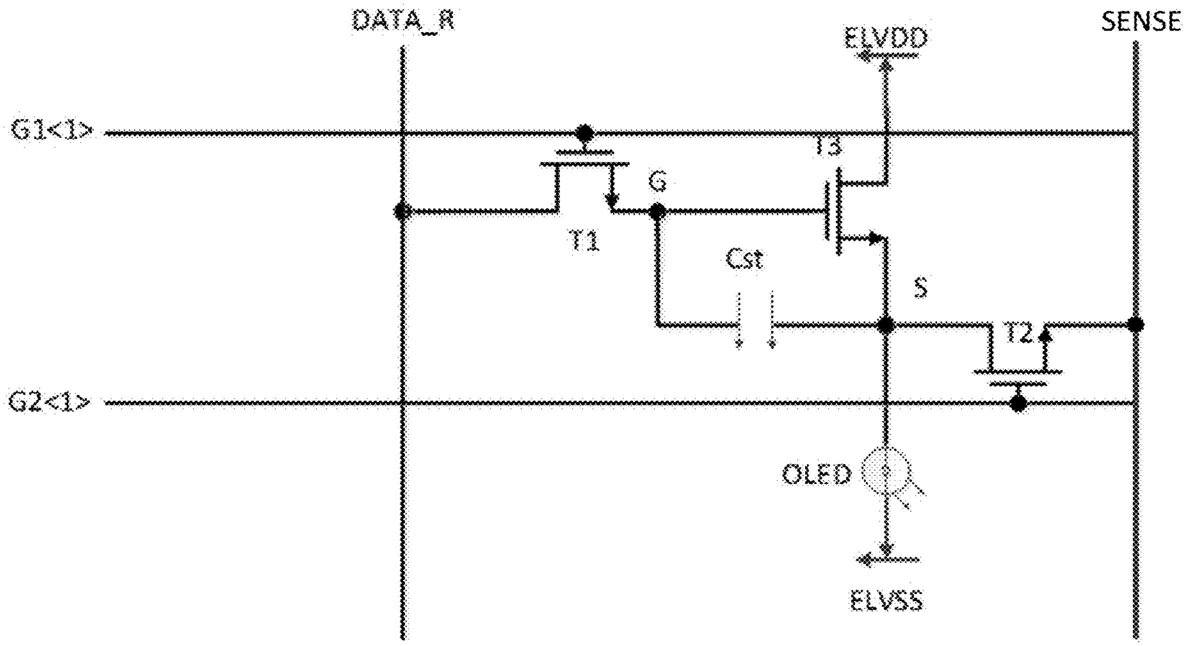

In this embodiment, as shown in FIG. 2*a* and FIG. 2*b*, the pixel driving circuit includes a data writing circuit, a driving circuit, an external control compensation circuit and a storage capacitor, and the data writing circuit includes a first transistor (T1), a gate of the first transistor (T1) is connected to a first gate line (G1), a first electrode of the first transistor (T1) is connected to a data line (DATA), and a second electrode of the first transistor (T1) is connected to a first node (G);

The external compensation control circuit comprises a second transistor (T2), a gate of the second transistor (T2) is connected to a second gate line (G2), a first electrode of the second transistor (T2) is connected to a compensation control line (SENSE), and a second electrode of the second transistor (T2) is connected to a second node(S);

The driving circuit comprises a driving transistor (T3), a gate of the driving transistor (T3) is connected to the first node (G), a first electrode of the driving transistor (T3) is connected to a high level signal line (ELVDD), a second electrode of the driving transistor (T3) is connected to the second node(S), and the driving transistor (T3) drives the light emitting diode OLED to emit light;

the storage capacitor (Cst) is connected to the first node (G), and the second plate of the storage capacitor is connected to the second node(S);

The pixel driving circuits are arranged in rows and columns, and each row of pixel driving circuits corresponds to two rows of gate lines: a first gate line (G1) and a second gate line (G2). As shown in FIG. 2*a*, G1<1> is the first gate line of the first row of pixel driving circuits, and G2<1> is the second gate line of the first row of pixel driving circuits; GI<2>is the first gate line of the second row of pixel driving circuits, and G2<2>is the second gate line of the second row of pixel driving circuits; G1<3> is the first gate line of the third row of pixel driving circuits, and G2<3> is the second gate line of the third row of pixel driving circuits. Each column of pixel driving circuits corresponds to a column of data lines. In this embodiment, the display device includes white sub-pixels and color sub-pixels, and the color sub-pixels include red sub-pixels, blue sub-pixels, and green sub-pixels. DATA_R provides data signals for the pixel driving circuits of red sub-pixels, DATA_W provides data signals for the pixel driving circuits of white sub-pixels, DATA_B provides data signals for the pixel driving circuits of blue sub-pixels, and DATA_G provides data signals for the pixel driving circuits of green sub-pixels.

As shown in FIG. 2 *a*, multiple columns of sub-pixels may share a compensation control line (SENSE); as shown in FIG. 2 *b*, multiple columns of sub-pixels may not share a compensation control line (SENSE).

Figure 3:
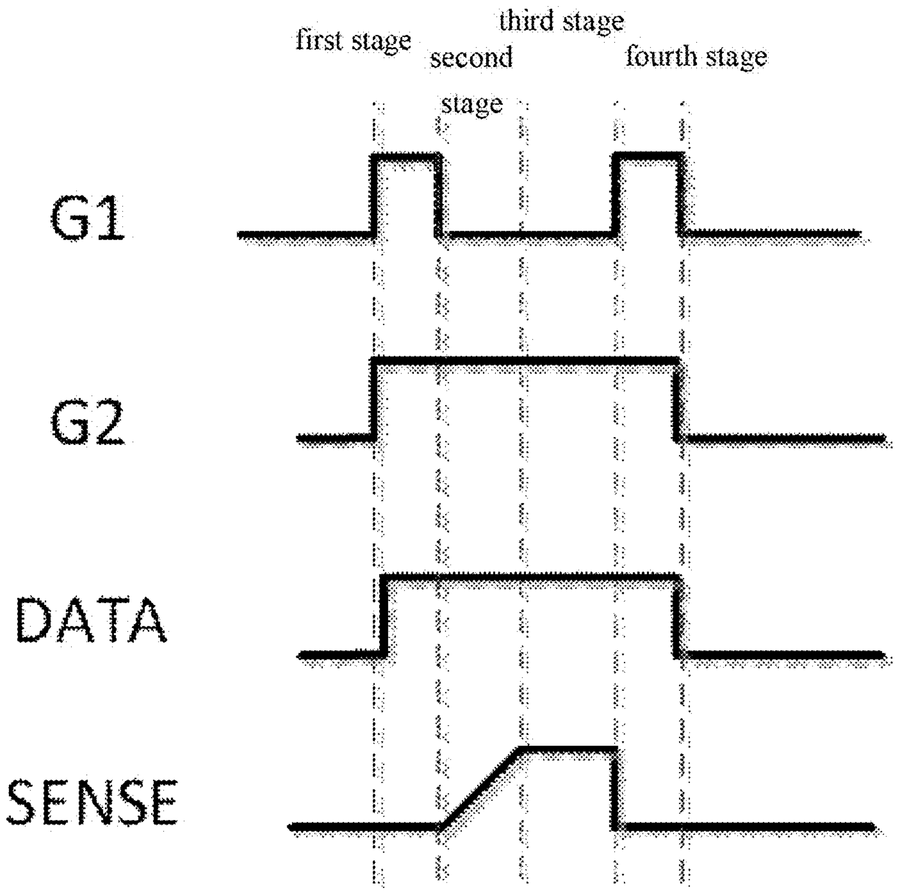
FIG. 3 is a schematic diagram of the display stage of an embodiment of the present disclosure.

As shown in FIG. 3, the display stage of the display device includes four stages:

In the first stage, a high potential electrical signal is input to the first gate line (G1) and the second gate line (G2), the first transistor (T1) and the second transistor (T2) are turned on, a data voltage is written to the first transistor (T1) through the data line, and a reference voltage (VREF) is written to the second transistor (T2) through the compensation control line (SENSE);

In the second stage, a low potential electrical signal is input to the first gate line (G1), a high potential electrical signal is input to the second gate line (G2), the potential of the electrical signal input to the compensation control line (SENSE) gradually increases, the first transistor (T1) is turned off, the second transistor (T2) is turned on, the driving transistor (T3) is turned on, the second node(S) starts to charge, and at this time the compensation control line (SENSE) is floating;

In the third stage, a low potential electrical signal is input to the first gate line (G1), a high potential electrical signal is input to the second gate line (G2), a high potential electrical signal is input to the compensation control line (SENSE), the first transistor (T1) is turned off, and the second transistor (T2) is turned on. At this time, a voltage signal of the second node(S) can be obtained and the voltage signal is converted into the value of the first parameter;

In the fourth stage, a high potential electrical signal is input to the first gate line (G1) and the second gate line (G2), a low potential electrical signal is input to the compensation control line (SENSE), the first transistor (T1) and the second transistor (T2) are turned on, a data voltage is written to the first transistor (T1) through the data line, and a reference voltage (VREF) is written to the second transistor (T2) through the compensation control line (SENSE).

In this embodiment, a voltage signal of the second node (S) is obtained and converted into the value of the first parameter. The voltage signal of the second node(S) is proportional to the threshold voltage of the driving transistor (T3) and can represent the duration of the driving transistor (T3) being turned on. By detecting the voltage signal of the second node(S), it can be detected whether the corresponding pixel driving circuit is in a display state for a long time.

Figure 4:
FIG. 4 is a schematic diagram of a display screen of a display device.

FIG. 4 is a schematic diagram of a display device in a video playback state. It can be seen that the brightness of the logo area (i.e., the location of CCTV13 news in the figure) is high and is in a display state for a long time. If the display device is in a video playback state for a long time, the high power consumption causes the temperature of the logo area to rise quickly, and the temperature difference with other areas is large, resulting in obvious afterimages. Of course, the area where afterimages appear is not limited to the logo area. Areas that are in a display state for a long time are more likely to have afterimage problems.

In this embodiment, the display area can be divided into multiple sub-areas arranged in an array, and the sub-areas of the display area can be controlled respectively. The preset area can include at least one of the sub-areas, that is, the display area can include A sub-region may also include multiple sub-regions. The preset region is the region to be detected in this embodiment. The value of at least one first parameter of the preset region is obtained, and the preset is determined based on the change in the value of the first parameter. Whether the area is displayed for a long time. If a certain pixel driving circuit is in the display state for a long time, the threshold voltage of the driving transistor of the pixel driving circuit will increase significantly. First, the first value of the first parameter corresponding to the driving transistor is obtained. After the first preset time period, obtain the second value of the first parameter. If the second value is greater than the first value and the difference between the second value and the first value is greater than the first preset threshold, it means that the pixel driving circuit is in the display state for a long time. The preset area generally includes multiple pixel driving circuits, and accordingly, the preset area includes multiple first parameters. Whether the preset area is in the display state for a long time can be determined based on the value change of at least one first parameter in the preset area, and determine the preset area that has been displayed for a long time as the target area, and perform display control on the target area.

In this embodiment, in order to perform refined control on the display device, the length of the sub-region does not exceed one quarter of the length of the display region, and the width of the sub-region does not exceed one quarter of the width of the display region.

Generally, the logo area is located in the four sub-areas at the corners of the display area. Therefore, in order to reduce the amount of calculation and detection, the preset area may include the four sub-areas at the corners of the display area; of course, in order to ensure the effect of eliminating the residual image, the preset area is not limited to including the four sub-areas at the comers of the display area, but may also include all the sub-areas of the display area. As shown in FIG. 5, the display area is divided into 5*5 sub-areas, and the preset area may include the four sub-areas A, B, C and D at the corners of the display area.

In this embodiment, it is possible to determine whether the preset area is the target area based on the value changes of some of the first parameters in the preset area, or it is possible to determine whether the preset area is the target area based on the value changes of all the first parameters in the preset area.

In some embodiments, the target area satisfies at least one of the following:

all the first parameters in the target area are greater than a first preset threshold value, that is, when the difference values of all the first parameters in the preset area are greater than the first preset threshold value, the preset area is determined to be the target area;

the difference of some first parameters in the target area is greater than the first preset threshold, that is, when the difference of some first parameters in the preset area are all greater than the first preset threshold, the preset area is judged to be the target area. In this embodiment, a preset ratio can be preset, and when the ratio of the number of first parameters with a difference greater than the first preset threshold to the total number of first parameters in the preset area is greater than the ratio, the preset area is judged to be the target area; or, a specific number is preset, and when the number of first parameters with a difference greater than the first preset threshold is greater than the specific number, the preset area is judged to be the target area;

all the first parameters in the target area are greater than a first preset threshold, that is, the average value of the difference values of all the first parameters in the preset area is calculated, and when the average value is greater than the first preset threshold, the preset area is determined to be the target area.

In a specific example, at a first time point, the first values of the first parameters of all sub-areas of the display area are obtained, and the average value of the first values of all the first parameters in the sub-areas is taken as the first value of the sub-area, and the first value of each sub-area is shown in FIG. 6; at a second time point after the first preset time period, the second values of the first parameters of all sub-areas of the display area are obtained, and the average value of the second values of all the first parameters in the sub-areas is taken as the second value of the sub-area, and the second value of each sub-area is shown in FIG. 7. It can be seen that the difference between the first value and the second value of the sub-area located in the upper left corner of the display area is 40, and the difference between the first value and the second value of the sub-area located in the upper right corner of the display area is 70, both of which are greater than the first preset threshold value of 30. Therefore, the sub-area located in the upper left corner of the display area and the sub-area located in the upper right corner of the display area can be determined as the target area. This embodiment is described with the value of the first preset threshold value of 30. Of course, the value of the first preset threshold value is not limited to 30, and can also be adjusted to other values as needed.

Figure 8:
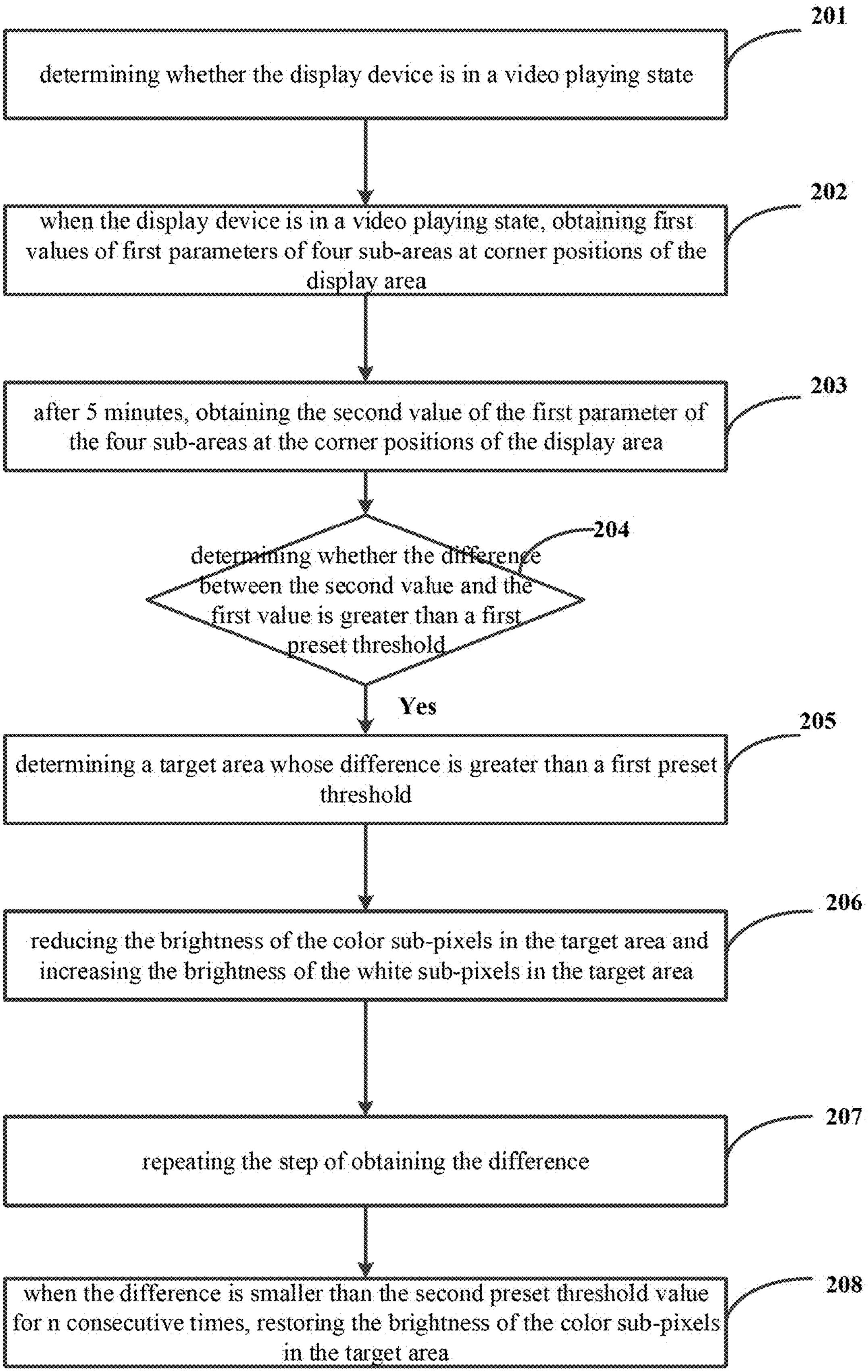
FIG. 8 is a flowchart of a specific example display processing method of the present disclosure.

In a specific example, the preset area includes four sub-areas located at the corners of the display area. As shown in FIG. 8, the display processing method of this embodiment includes the following steps:

Step 201: determining whether the display device is in a video playing state;

Step 202: when the display device is in a video playing state, obtaining first values of first parameters of four sub-areas at corner positions of the display area;

In this embodiment, the first values of the first parameters of all pixel driving circuits in each sub-region may be obtained, and the average value of the first values of the first parameters of all pixel driving circuits may be used as the first value of the first parameter of the sub-region.

Step 203: after 5 minutes, obtaining the second value of the first parameter of the four sub-areas at the corner positions of the display area;

In this embodiment, the duration of the first preset time period may be 5 minutes. Of course, the duration of the first preset time period is not limited to 5 minutes, and other values may be adjusted as needed.

In this embodiment, the second value of the first parameter of all pixel driving circuits in each sub-region may be obtained, and the average value of the second value of the first parameter of all pixel driving circuits may be used as the second value of the first parameter of the sub-region.

Step 204: determining whether the difference between the second value and the first value is greater than a first preset threshold;

For each sub-region, subtract the first value from the second value to obtain a difference between the second value and the first value, and determine whether the difference between the second value and the first value is greater than a first preset threshold. If so, go to step 205;

Step 205: determining a target area whose difference is greater than a first preset threshold;

The sub-region where the difference between the second value and the first value is greater than the first preset threshold is determined as the target region. The value of the first preset threshold may be 30. Of course, the value of the first preset threshold is not limited to 30 and may be adjusted to other values as needed.

Step 206: reducing the brightness of the color sub-pixels in the target area and increasing the brightness of the white sub-pixels in the target area;

In this embodiment, the brightness of the color sub-pixels of the target area is reduced, thereby reducing the power consumption and current density of the target area, reducing the temperature difference between the target area and other areas, and eliminating the afterimage; in order to ensure the overall brightness of the target area, while reducing the brightness of the color sub-pixels of the target area, it is also necessary to increase the brightness of the white sub-pixels of the target area accordingly. After the brightness of the white sub-pixels of the target area is increased accordingly, the overall brightness of the target area remains unchanged, so that the human eye will not clearly perceive the brightness changes in the target area.

In this embodiment, the brightness of the color sub-pixels in the target area may be reduced to 90%, 80%, 70%, 60%, 50%, 40% or 30% of the initial brightness.

Step 207: repeating the step of obtaining the difference;

Specifically, steps 202-203 can be repeatedly executed to obtain the difference. For example, in the T1-T2 time period, steps 202-203 are executed to obtain the first difference, T2 is later than T1, and the time length between T2 and T1 is 5 minutes; in the T2-T3 time period, steps 202-203 are executed to obtain the second difference, T3 is later than T2 , and the time length between T2 and T2 is 5 minutes; in the T3-T4 time period, steps 202-203 are executed to obtain the third difference, T4 is later than T3, and the time length between T3 and T3 is 5 minutes, and so on, to obtain multiple consecutive differences.

Step 208: when the difference is smaller than the second preset threshold value for n consecutive times, restoring the brightness of the color sub-pixels in the target area.

Specifically, n is an integer greater than 2, and the second preset threshold is less than the first preset threshold, for example, the second preset threshold may be 15. When the difference is less than the second preset threshold for multiple consecutive times, it indicates that the target area is no longer in a long-term display state, and the brightness of the color sub-pixels of the target area can be restored, that is, the brightness of the color sub-pixels of the target area can be restored to the initial brightness. At the same time, the brightness of the white sub-pixels of the target area can also be restored, that is, the brightness of the white sub-pixels of the target area can be restored to the initial brightness.

Figure 9:
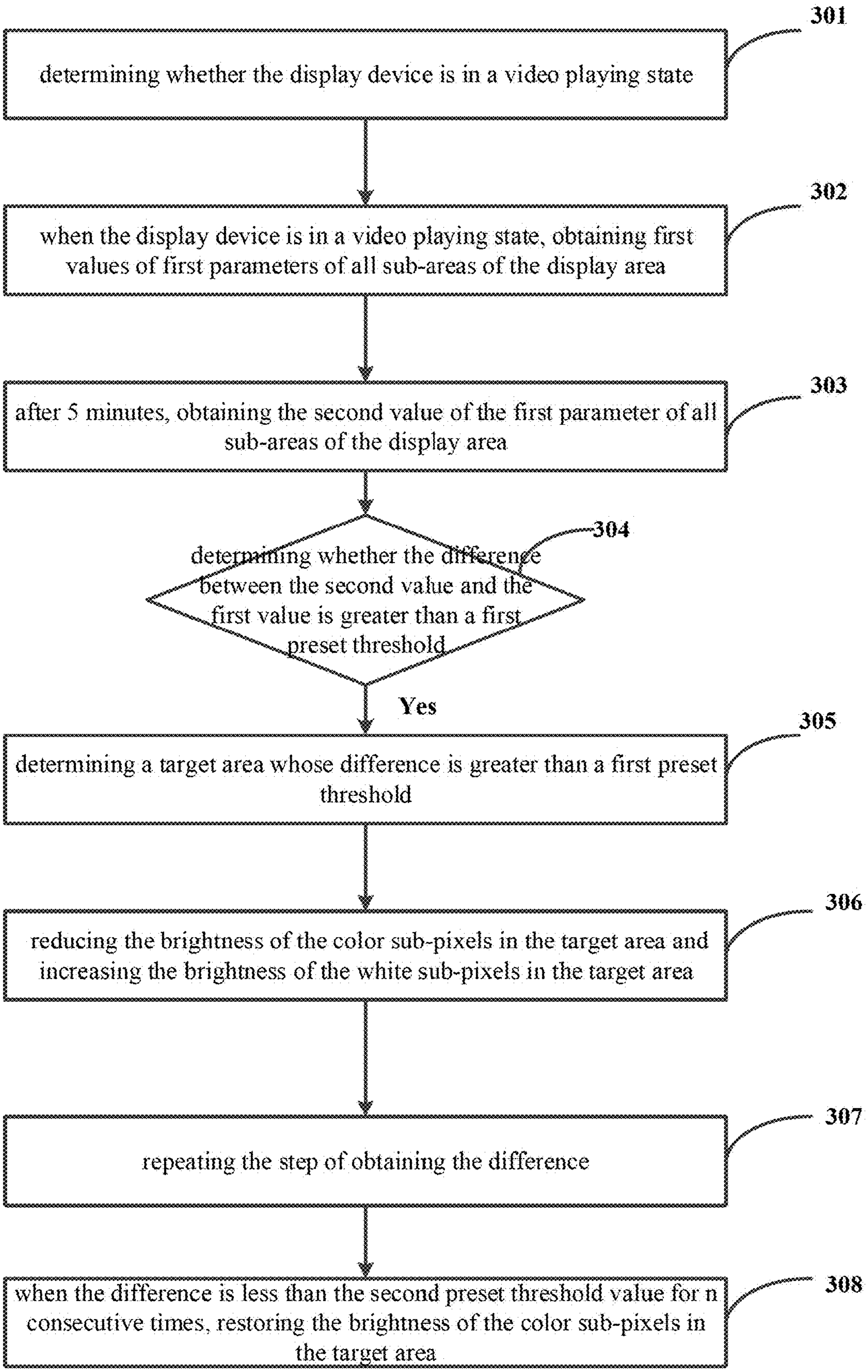
FIG. 9 is a flowchart of another specific example of a display processing method of the present disclosure.

In another specific example, the preset area includes all sub-areas of the display area. As shown in FIG 9., the display processing method of this embodiment includes the following steps:

Step 301: determining whether the display device is in a video playing state;

Step 302: when the display device is in a video playing state, obtaining first values of first parameters of all sub-areas of the display area;

In this embodiment, the first values of the first parameters of all pixel driving circuits in each sub-region may be obtained, and the average value of the first values of the first parameters of all pixel driving circuits may be used as the first value of the first parameter of the sub-region.

Step 303: after 5 minutes, obtaining the second value of the first parameter of all sub-areas of the display area;

In this embodiment, the duration of the first preset time period may be 5 minutes. Of course, the duration of the first preset time period is not limited to 5 minutes, and other values may be adjusted as needed.

In this embodiment, the second value of the first parameter of all pixel driving circuits in each sub-region may be obtained, and the average value of the second value of the first parameter of all pixel driving circuits may be used as the second value of the first parameter of the sub-region.

Step 304: determining whether the difference between the second value and the first value is greater than a first preset threshold;

For each sub-region, subtract the first value from the second value to obtain a difference between the second value and the first value, and determine whether the difference between the second value and the first value is greater than a first preset threshold. If so, go to step 305;

Step 305: determining a target area whose difference is greater than a first preset threshold;

The sub-region where the difference between the second value and the first value is greater than the first preset threshold is determined as the target region. The value of the first preset threshold may be 30. Of course, the value of the first preset threshold is not limited to 30 and may be adjusted to other values as needed.

In a specific example, at a first time point, the first value of the first parameter of all sub-areas of the display area is obtained, and the average value of the first values of all the first parameters in the sub-area is taken as the first value of the sub-area, and the first value of each sub-area is shown in FIG 6.; at a second time point 5 minutes later, the second value of the first parameter of all sub-areas of the display area is obtained, and the average value of the second values of all the first parameters in the sub-area is taken as the second value of the sub-area, and the second value of each sub-area is shown in FIG 7.. It can be seen that the difference between the first value and the second value of the sub-area located in the upper left corner of the display area is 40, and the difference between the first value and the second value of the sub-area located in the upper right corner of the display area is 70, both of which are greater than the first preset threshold value of 30. Therefore, the sub-area located in the upper left corner of the display area and the sub-area located in the upper right corner of the display area can be determined as the target area.

Step 306: reducing the brightness of the color sub-pixels in the target area and increasing the brightness of the white sub-pixels in the target area;

In this embodiment, the brightness of the color sub-pixels of the target area is reduced, thereby reducing the power consumption and current density of the target area, reducing the temperature difference between the target area and other areas, and eliminating the afterimage; in order to ensure the overall brightness of the target area, while reducing the brightness of the color sub-pixels of the target area, it is also necessary to increase the brightness of the white sub-pixels of the target area accordingly. After the brightness of the white sub-pixels of the target area is increased accordingly, the overall brightness of the target area remains unchanged, so that the human eye will not clearly perceive the brightness changes of the target area.

In this embodiment, the brightness of the color sub-pixels in the target area may be reduced to 90%, 80%, 70%, 60%, 50%, 40% or 30% of the initial brightness.

Step 307: repeating the step of obtaining the difference;

Specifically, steps 302-303 can be repeatedly executed to obtain the difference. For example, in the T1-T2 time period, steps 302-303 are executed to obtain the first difference, T2 is later than T1, and the time length between T2 and T1 is 5 minutes; in the T2-T3 time period, steps 302-303 are executed to obtain the second difference, T3 is later than T2, and the time length between T2 and T2 is 5 minutes; in the T3-T4 time period, steps 302-303 are executed to obtain the third difference, T4 is later than T3, and the time length between T3 and T3 is 5 minutes, and so on, to obtain multiple consecutive differences.

Step 308: when the difference is less than the second preset threshold value for n consecutive times, restoring the brightness of the color sub-pixels in the target area.

Specifically, n is an integer greater than 2, and the second preset threshold is less than the first preset threshold, for example, the second preset threshold may be 15. When the difference is less than the second preset threshold for multiple consecutive times, it indicates that the target area is no longer in a long-term display state, and the brightness of the color sub-pixels of the target area can be restored, that is, the brightness of the color sub-pixels of the target area can be restored to the initial brightness. At the same time, the brightness of the white sub-pixels of the target area can also be restored, that is, the brightness of the white sub-pixels of the target area can be restored to the initial brightness.

Figure 10:
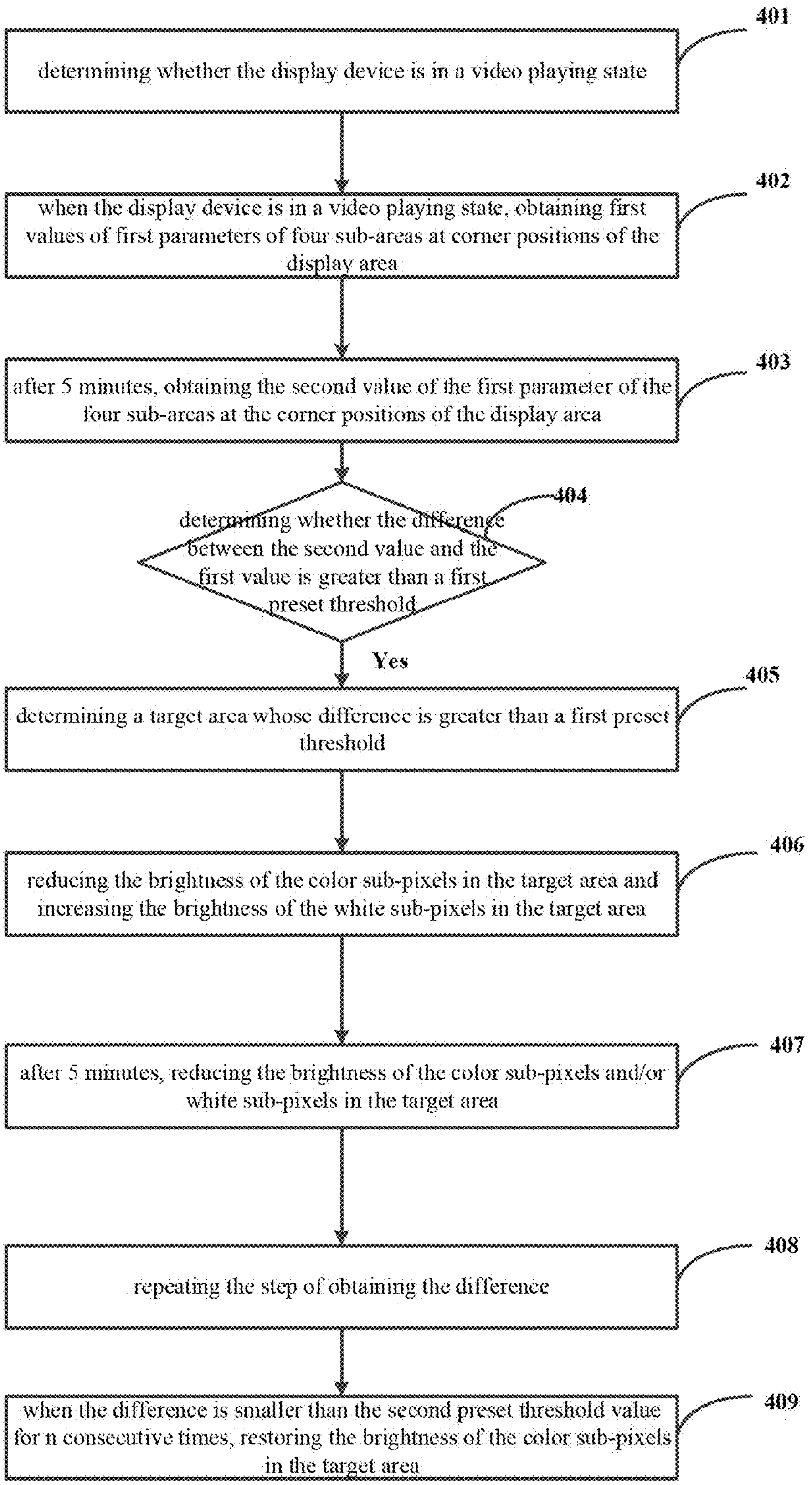
FIG. 10 is a flowchart of another specific example display processing method of the present disclosure.

In another specific example, the preset area includes four sub-areas located at the corners of the display area. As shown in FIG 10., the display processing method of this embodiment includes the following steps:

Step 401: determining whether the display device is in a video playing state;

Step 402: when the display device is in a video playing state, obtaining first values of first parameters of four sub-areas at corner positions of the display area;

In this embodiment, the first values of the first parameters of all pixel driving circuits in each sub-region may be obtained, and the average value of the first values of the first parameters of all pixel driving circuits may be used as the first value of the first parameter of the sub-region.

Step 403: after 5 minutes, obtaining the second value of the first parameter of the four sub-areas at the corner positions of the display area;

In this embodiment, the duration of the first preset time period may be 5 minutes. Of course, the duration of the first preset time period is not limited to 5 minutes, and other values may be adjusted as needed.

In this embodiment, the second value of the first parameter of all pixel driving circuits in each sub-region may be obtained, and the average value of the second value of the first parameter of all pixel driving circuits may be used as the second value of the first parameter of the sub-region.

Step 404: determining whether the difference between the second value and the first value is greater than a first preset threshold;

For each sub-region, subtract the first value from the second value to obtain a difference between the second value and the first value, and determine whether the difference between the second value and the first value is greater than a first preset threshold. If so, go to step 405;

Step 405; determining a target area whose difference is greater than a first preset threshold;

The sub-region where the difference between the second value and the first value is greater than the first preset threshold is determined as the target region. The value of the first preset threshold may be 30. Of course, the value of the first preset threshold is not limited to 30 and may be adjusted to other values as needed.

Step 406: reducing the brightness of the color sub-pixels in the target area and increasing the brightness of the white sub-pixels in the target area;

In this embodiment, the brightness of the color sub-pixels of the target area is reduced, thereby reducing the power consumption and current density of the target area, reducing the temperature difference between the target area and other areas, and eliminating the afterimage; in order to ensure the overall brightness of the target area, while reducing the brightness of the color sub-pixels of the target area, it is also necessary to increase the brightness of the white sub-pixels of the target area accordingly. After the brightness of the white sub-pixels of the target area is increased accordingly, the overall brightness of the target area remains unchanged, so that the human eye will not clearly perceive the brightness changes in the target area.

In this embodiment, the brightness of the color sub-pixels in the target area may be reduced to 90%, 80%, 70%, 60%, 50%, 40% or 30% of the initial brightness.

Step 407: after 5 minutes, reducing the brightness of the color sub-pixels and/or white sub-pixels in the target area;

In this embodiment, the overall brightness of the target area can be reduced to further reduce the afterimage. Only the brightness of the color sub-pixels of the target area can be reduced, or only the brightness of the white sub-pixels of the target area can be reduced, or the brightness of both the color sub-pixels and the white sub-pixels of the target area can be reduced.

Step 408: repeating the step of obtaining the difference;

Specifically, steps 402-403 can be repeatedly executed to obtain the difference. For example, in the T1-T2 time period, steps 402-403 are executed to obtain the first difference, T2 is later than T1, and the time length between T2 and T1 is 5 minutes; in the T2-T3 time period, steps 402-403 are executed to obtain the second difference, T3 is later than T2, and the time length between T2 and T2 is 5 minutes; in the T3-T4 time period, steps 402-403 are executed to obtain the third difference, T4 is later than T3, and the time length between T3 and T3 is 5 minutes, and so on, to obtain multiple consecutive differences.

Step 409: when the difference is smaller than the second preset threshold value for n consecutive times, restoring the brightness of the color sub-pixels in the target area.

Specifically, n is an integer greater than 2, and the second preset threshold is less than the first preset threshold, for example, the second preset threshold may be 15. When the difference is less than the second preset threshold for multiple consecutive times, it indicates that the target area is no longer in a long-term display state, and the brightness of the color sub-pixels of the target area can be restored, that is, the brightness of the color sub-pixels of the target area can be restored to the initial brightness. At the same time, the brightness of the white sub-pixels of the target area can also be restored, that is, the brightness of the white sub-pixels of the target area can be restored to the initial brightness.

Figure 11:
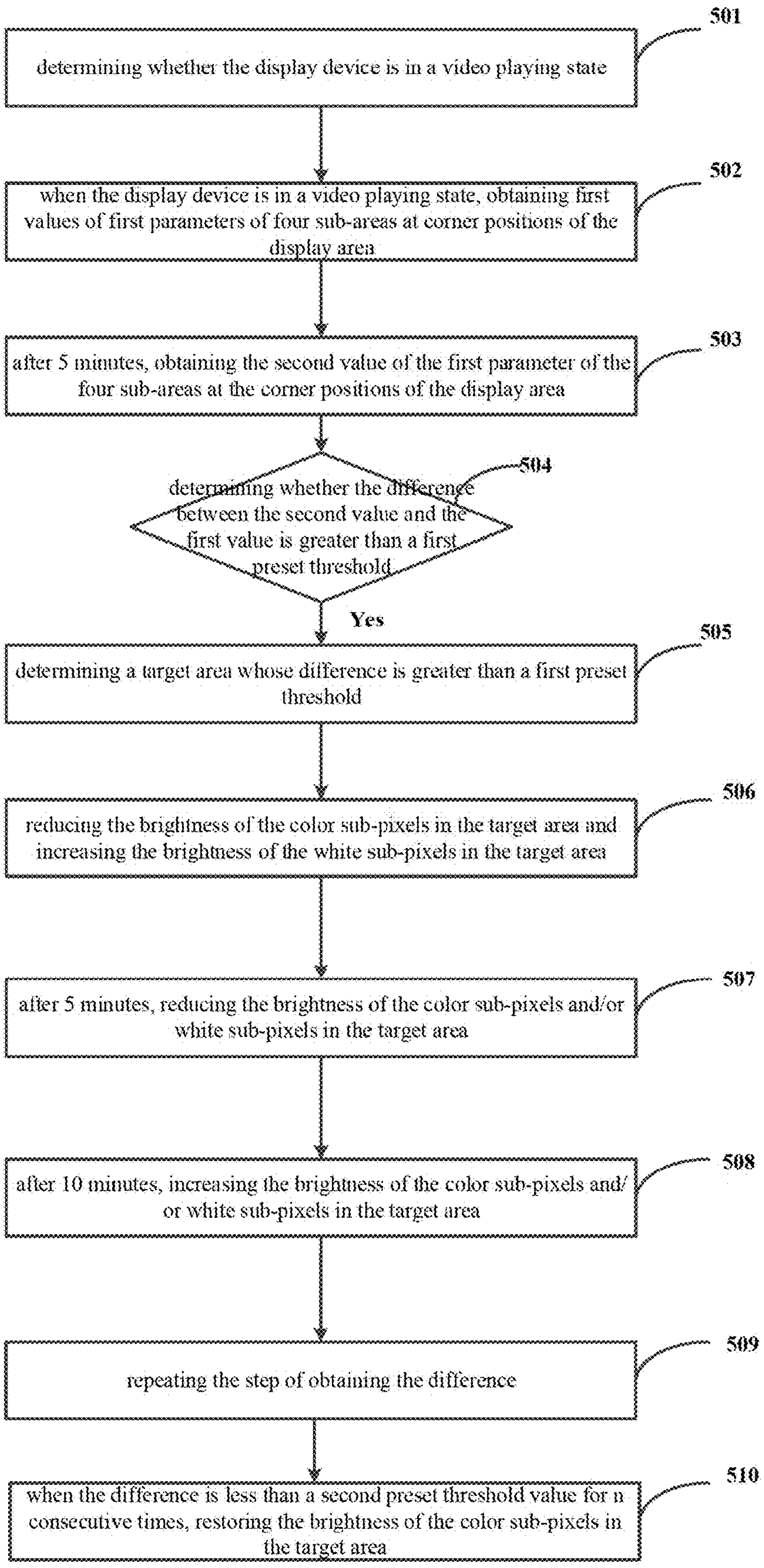
FIG. 11 is a flowchart of another specific example of a display processing method of the present disclosure.

In another specific example, the preset area includes four sub-areas located at the comers of the display area, as shown in FIG11, and the display processing method of this embodiment includes the following steps:

Step 501: determining whether the display device is in a video playing state;

Step 502: when the display device is in a video playing state, obtaining first values of first parameters of four sub-areas at corner positions of the display area;

In this embodiment, the first values of the first parameters of all pixel driving circuits in each sub-region may be obtained, and the average value of the first values of the first parameters of all pixel driving circuits may be used as the first value of the first parameter of the sub-region.

Step 503: after 5 minutes, obtaining the second value of the first parameter of the four sub-areas at the corner positions of the display area;

In this embodiment, the duration of the first preset time period may be 5 minutes. Of course, the duration of the first preset time period is not limited to 5 minutes, and other values may be adjusted as needed.

In this embodiment, the second value of the first parameter of all pixel driving circuits in each sub-region may be obtained, and the average value of the second value of the first parameter of all pixel driving circuits may be used as the second value of the first parameter of the sub-region.

Step 504: determining whether the difference between the second value and the first value is greater than a first preset threshold;

For each sub-region, subtract the first value from the second value to obtain a difference between the second value and the first value, and determine whether the difference between the second value and the first value is greater than a first preset threshold. If so, go to step 505;

Step 505: determining a target area whose difference is greater than a first preset threshold;

The sub-region where the difference between the second value and the first value is greater than the first preset threshold is determined as the target region. The value of the first preset threshold may be 30. Of course, the value of the first preset threshold is not limited to 30 and may be adjusted to other values as needed.

Step 506: reducing the brightness of the color sub-pixels in the target area and increasing the brightness of the white sub-pixels in the target area;

In this embodiment, the brightness of the color sub-pixels of the target area is reduced, thereby reducing the power consumption and current density of the target area, reducing the temperature difference between the target area and other areas, and eliminating the afterimage; in order to ensure the overall brightness of the target area, while reducing the brightness of the color sub-pixels of the target area, it is also necessary to increase the brightness of the white sub-pixels of the target area accordingly. After the brightness of the white sub-pixels of the target area is increased accordingly, the overall brightness of the target area remains unchanged, so that the human eye will not clearly perceive the brightness changes in the target area.

In this embodiment, the brightness of the color sub-pixels in the target area may be reduced to 90%, 80%, 70%, 60%, 50%, 40% or 30% of the initial brightness.

Step 507: after 5 minutes, reducing the brightness of the color sub-pixels and/or white sub-pixels in the target area;

In this embodiment, the overall brightness of the target area can be reduced to further reduce the afterimage. Only the brightness of the color sub-pixels of the target area can be reduced, or only the brightness of the white sub-pixels of the target area can be reduced, or the brightness of both the color sub-pixels and the white sub-pixels of the target area can be reduced.

Step 508: after 10 minutes, increasing the brightness of the color sub-pixels and/or white sub-pixels in the target area;

In this embodiment, only the brightness of the color sub-pixels in the target area may be increased, only the brightness of the white sub-pixels in the target area may be increased, or both the brightness of the color sub-pixels and the white sub-pixels in the target area may be increased.

Through steps 507-508, the brightness and color of the target area are changed in a cyclic manner, which can help reduce the afterimage of the target area.

Step 509: repeating the step of obtaining the difference;

Specifically, while looping through steps 507-508, steps 502-503 can be repeatedly executed to obtain the difference. For example, in the T1-T2 time period, steps 502-503 are executed to obtain the first difference, where T2 is later than T1 and the time between T2 and T1 is 5 minutes; in the T2-T3 time period, steps 502-503 are executed to obtain the second difference, where T3 is later than T2 and the time between T2 and T2 is 5 minutes; in the T3-T4 time period, steps 502-503 are executed to obtain the third difference, where T4 is later than T3 and the time between T3 and T3 is 5 minutes, and so on, to obtain multiple consecutive differences.

Steps 507-508 are executed cyclically, that is, step 507 is executed in the T1-T2 time period; step 508 is executed in the T2-T3 time period; step 507 is executed in the T3-T4 time period; step 508 is executed in the T4-T5 time period, and so on. T5 is later than T4, and the time between T5 and T4 is 5 minutes.

Step 510: when the difference is less than a second preset threshold value for n consecutive times, restoring the brightness of the color sub-pixels in the target area.

Specifically, n is an integer greater than 2, and the second preset threshold is less than the first preset threshold, for example, the second preset threshold may be 15. When the difference is less than the second preset threshold for multiple consecutive times, it indicates that the target area is no longer in a long-term display state, and the brightness of the color sub-pixels of the target area can be restored, that is, the brightness of the color sub-pixels of the target area can be restored to the initial brightness. At the same time, the brightness of the white sub-pixels of the target area can also be restored, that is, the brightness of the white sub-pixels of the target area can be restored to the initial brightness.

Figure 12:
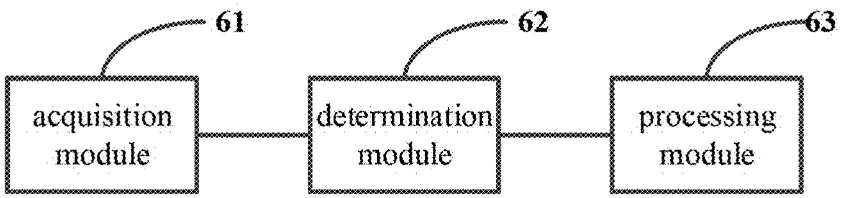
FIG. 12 is a structural block diagram of a display processing device according to an embodiment of the present disclosure.

The embodiment of the present disclosure further provides a display processing device, which is applied to a display device, wherein a display area of the display device includes color sub-pixels and white sub-pixels. As shown in FIG. 12, the device includes:

a acquisition module 61, configured to acquire, when the display device is in a video playback state, a first value of at least one first parameter of a preset area of the display area, wherein the first parameter corresponds to a driving transistor of a pixel driving circuit of the preset area, and the value of the first parameter is proportional to a threshold voltage of the corresponding driving transistor; and acquire a second value of each first parameter after a first preset time period;

a determination module 62, configured to determine a target area according to a difference between the second value and the first value, wherein the difference of at least part of the first parameter of the target area is greater than a first preset threshold;

a processing module 63, configured to reduce the brightness of the color sub-pixels in the target area.

In this embodiment, when the target area is in the display state for a long time, the value of the first parameter of the target area will change significantly. By detecting the value of the first parameter, it is possible to detect whether the target area is in the display state for a long time. If the target area is in the display state for a long time, the temperature difference between the target area and other areas will be relatively large, and afterimages are likely to appear. Therefore, the brightness of the color sub-pixels in the target area can be reduced, thereby reducing the power consumption and current density of the target area, narrowing the temperature difference between the target area and other areas, and eliminating afterimages.

In some embodiments, the processing module 63 is further configured to increase the brightness of the white sub-pixels in the target area while reducing the brightness of the color sub-pixels in the target area. In order to ensure the overall brightness of the target area, while reducing the brightness of the color sub-pixels in the target area, it is also necessary to increase the brightness of the white sub-pixels in the target area accordingly, so that the human eye will not clearly perceive the brightness change of the target area.

In this embodiment, as shown in FIG. 2*a* and FIG. 2*b*, the pixel driving circuit includes a data writing circuit, a driving circuit, an external control compensation circuit and a storage capacitor, and the data writing circuit includes a first transistor (T1), a gate of the first transistor (T1) is connected to a first gate line (G1), a first electrode of the first transistor (T1) is connected to a data line (DATA), and a second electrode of the first transistor (T1) is connected to a first node (G);

The external compensation control circuit comprises a second transistor (T2), a gate of the second transistor (T2) is connected to a second gate line (G2), a first electrode of the second transistor (T2) is connected to a compensation control line (SENSE), and a second electrode of the second transistor (T2) is connected to a second node(S);

The driving circuit comprises a driving transistor (T3), a gate of the driving transistor (T3) is connected to the first node (G), a first electrode of the driving transistor (T3) is connected to a high level signal line (ELVDD), a second electrode of the driving transistor (T3) is connected to the second node(S), and the driving transistor (T3) drives the light emitting diode OLED to emit light;

the storage capacitor (Cst) is connected to the first node (G), and the second plate of the storage capacitor is connected to the second node(S);

The pixel driving circuits are arranged in rows and columns, and each row of pixel driving circuits corresponds to two rows of gate lines: a first gate line (G1) and a second gate line (G2). As shown in FIG. 2*a*, G1<1>is the first gate line of the first row of pixel driving circuits, and G2<1>is the second gate line of the first row of pixel driving circuits; G1<2>is the first gate line of the second row of pixel driving circuits, and G2<2>is the second gate line of the second row of pixel driving circuits; G1<3>is the first gate line of the third row of pixel driving circuits, and G2<3>is the second gate line of the third row of pixel driving circuits. Each column of pixel driving circuits corresponds to a column of data lines. In this embodiment, the display device includes white sub-pixels and color sub-pixels, and the color sub-pixels include red sub-pixels, blue sub-pixels, and green sub-pixels. DATA_R provides data signals for the pixel driving circuits of red sub-pixels, DATA_W provides data signals for the pixel driving circuits of white sub-pixels, DATA_B provides data signals for the pixel driving circuits of blue sub-pixels, and DATA_G provides data signals for the pixel driving circuits of green sub-pixels.

As shown in FIG. 2*a*, multiple columns of sub-pixels may share a compensation control line (SENSE); as shown in FIG. 2*b*, multiple columns of sub-pixels may not share a compensation control line (SENSE).

As shown in FIG. 3, the display stage of the display device includes four stages:

In the first stage, a high potential electrical signal is input to the first gate line (G1) and the second gate line (G2), the first transistor (T1) and the second transistor (T2) are turned on, a data voltage is written to the first transistor (T1) through the data line, and a reference voltage (VREF) is written to the second transistor (T2) through the compensation control line (SENSE);

In the second stage, a low potential electrical signal is input to the first gate line (G1), a high potential electrical signal is input to the second gate line (G2), the potential of the electrical signal input to the compensation control line (SENSE) gradually increases, the first transistor (T1) is turned off, the second transistor (T2) is turned on, the driving transistor (T3) is turned on, the second node(S) starts to charge, and at this time the compensation control line (SENSE) is floating;

In the third stage, a low potential electrical signal is input to the first gate line (G1), a high potential electrical signal is input to the second gate line (G2), a high potential electrical signal is input to the compensation control line (SENSE), the first transistor (T1) is turned off, and the second transistor (T2) is turned on. At this time, a voltage signal of the second node(S) can be obtained and converted into the value of the first parameter;

In the fourth stage, a high potential electrical signal is input to the first gate line (G1) and the second gate line (G2), a low potential electrical signal is input to the compensation control line (SENSE), the first transistor (T1) and the second transistor (T2) are turned on, a data voltage is written to the first transistor (T1) through the data line, and a reference voltage (VREF) is written to the second transistor (T2) through the compensation control line (SENSE).

In this embodiment, the acquisition module 61 is specifically configured to acquire the voltage signal of the second node in the third stage, and convert the voltage signal into the value of the first parameter. The voltage signal of the second node(S) is proportional to the threshold voltage of the driving transistor (T3), and can represent the duration of the driving transistor (T3) being turned on. By detecting the voltage signal of the second node(S), it can be detected whether the corresponding pixel driving circuit is in a display state for a long time.

FIG. 4 is a schematic diagram of the display device in the video playback state. It can be seen that the brightness of the logo area (i.e., the location of CCTV13 News in the figure) is high and is in the display state for a long time. If the display device is in the video playback state for a long time, the high power consumption causes the temperature of the logo area to rise quickly, and the temperature difference with other areas is large, resulting in obvious afterimages. Of course, the area where afterimages appear is not limited to the logo area. Areas that are in the display state for a long time are more likely to have afterimage problems.

In this embodiment, the display area can be divided into a plurality of sub-areas arranged in an array, and the sub-areas of the display area are controlled separately, wherein the preset area may include at least one of the sub-areas, that is, the display area may include one sub-area or may include multiple sub-areas, and the preset area is the area to be detected in this embodiment, and the value of at least one first parameter of the preset area is obtained, and it is judged whether the preset area is in a display state for a long time according to the change of the value of the first parameter. If a certain pixel driving circuit is in a display state for a long time, the threshold voltage of the driving transistor of the pixel driving circuit will increase, firstly, the first value of the first parameter corresponding to the driving transistor is obtained, and after a first preset time period, the second value of the first parameter is obtained, and if the second value is greater than the first value and the difference between the second value and the first value is greater than the first preset threshold value, it indicates that the pixel driving circuit is in a display state for a long time; the preset area generally includes multiple pixel driving circuits, and correspondingly, the preset area includes multiple first parameters, and it can be judged whether the preset area is in a display state for a long time according to the change of the value of at least one first parameter in the preset area, and the preset area in a display state for a long time is determined as the target area, and the display control is performed on the target area.

In this embodiment, in order to perform refined control on the display device, the length of the sub-region does not exceed one quarter of the length of the display region, and the width of the sub-region does not exceed one quarter of the width of the display region.

Generally, the logo area is located in the four sub-areas at the corners of the display area. Therefore, in order to reduce the amount of calculation and detection, the preset area may include the four sub-areas at the corners of the display area; of course, in order to ensure the effect of eliminating the residual image, the preset area is not limited to including the four sub-areas at the corners of the display area, but may also include all the sub-areas of the display area. As shown in FIG. 5, the display area is divided into 5*5 sub-areas, and the preset area may include four sub-areas A, B, C and D at the corners of the display area.

In this embodiment, it is possible to determine whether the preset area is the target area based on the value changes of some of the first parameters in the preset area, or it is possible to determine whether the preset area is the target area based on the value changes of all the first parameters in the preset area.

In some embodiments, the target area satisfies at least one of the following:

all the first parameters in the target area are greater than a first preset threshold value, that is, when the difference values of all the first parameters in the preset area are greater than the first preset threshold value, the preset area is determined to be the target area;

The difference of some first parameters in the target area is greater than the first preset threshold, that is, when the difference of some first parameters in the preset area are all greater than the first preset threshold, the preset area is judged to be the target area. In this embodiment, a preset ratio can be preset, and when the ratio of the number of first parameters with a difference greater than the first preset threshold to the total number of first parameters in the preset area is greater than the ratio, the preset area is judged to be the target area; or, a specific number is preset, and when the number of first parameters with a difference greater than the first preset threshold is greater than the specific number, the preset area is judged to be the target area;

All the first parameters in the target area is greater than a first preset threshold, that is, the average value of the difference values of all the first parameters in the preset area is calculated, and when the average value is greater than the first preset threshold, the preset area is determined to be the target area.

In a specific example, at a first time point, the first values of the first parameters of all sub-areas of the display area are obtained, and the average value of the first values of all the first parameters in the sub-areas is taken as the first value of the sub-area, and the first value of each sub-area is shown in FIG. 6; at a second time point after the first preset time period, the second values of the first parameters of all sub-areas of the display area are obtained, and the average value of the second values of all the first parameters in the sub-areas is taken as the second value of the sub-area, and the second value of each sub-area is shown in FIG 7.. It can be seen that the difference between the first value and the second value of the sub-area located in the upper left corner of the display area is 40, and the difference between the first value and the second value of the sub-area located in the upper right corner of the display area is 70, both of which are greater than the first preset threshold value of 30. Therefore, the sub-area located in the upper left corner of the display area and the sub-area located in the upper right corner of the display area can be determined as the target area. This embodiment is described with the value of the first preset threshold value of 30. Of course, the value of the first preset threshold value is not limited to 30, and can also be adjusted to other values as needed.

In some embodiments, the processing module 63 is further configured to repeat the step of obtaining the difference after reducing the brightness of the colored sub-pixels of the target area, and restore the brightness of the colored sub-pixels of the target area when the difference is less than a second preset threshold value for n consecutive times, where n is an integer greater than 2, and the second preset threshold value is less than the first preset threshold value.

In some embodiments, the processing module 63 is also configured to reduce the brightness of the colored sub-pixels of the target area and increase the brightness of the white sub-pixels of the target area, and then after a second preset time period, reduce the brightness of the colored sub-pixels and/or white sub-pixels of the target area, and repeat the step of obtaining the difference, and restore the brightness of the colored sub-pixels and/or white sub-pixels of the target area when the difference is less than a second preset threshold value for n consecutive times, where n is an integer greater than 2, and the second preset threshold value is less than the first preset threshold value.

In some embodiments, the processing module 63 is also configured to, after reducing the brightness of the colored sub-pixels of the target area and increasing the brightness of the white sub-pixels of the target area, cyclically execute the steps of reducing and increasing the brightness of the colored sub-pixels and/or white sub-pixels of the target area after a second preset time period, and repeat the step of obtaining the difference, and restore the brightness of the colored sub-pixels and/or white sub-pixels of the target area when the difference is less than a second preset threshold value for n consecutive times, where n is an integer greater than 2, and the second preset threshold value is less than the first preset threshold value.

The embodiment of the present disclosure also provides a display device, including the display processing apparatus as described above.

The display device includes but is not limited to: a radio frequency unit, a network module, an audio output unit, an input unit, a sensor, a display unit, a user input unit, an interface unit, a memory, a processor, and a power supply. Those skilled in the art will appreciate that the structure of the above-mentioned display device does not constitute a limitation on the display device, and the display device may include more or less of the above-mentioned components, or a combination of certain components, or different component arrangements. In the embodiments of the present disclosure, the display device includes but is not limited to a display, a mobile phone, a tablet computer, a television, a wearable electronic device, a navigation display device, and the like.

The display device may be any product or component with a display function, such as a television, a monitor, a digital photo frame, a mobile phone, a tablet computer, etc., wherein the display device further includes a flexible circuit board, a printed circuit board and a backplane.

In the various method embodiments of the present disclosure, the serial numbers of the steps cannot be configured to limit the sequence of the steps. For ordinary technicians in this field, without paying any creative work, changes to the sequence of the steps are also within the protection scope of the present disclosure.

It should be noted that each embodiment in this specification is described in a progressive manner, and the same or similar parts between the embodiments can be referred to each other, and each embodiment focuses on the differences from other embodiments. In particular, for the embodiments, since they are basically similar to the product embodiments, the description is relatively simple, and the relevant parts can be referred to the partial description of the product embodiments.

Unless otherwise defined, the technical terms or scientific terms used in the present disclosure should be understood by people with ordinary skills in the field to which the present disclosure belongs. The "first", "second" and similar words used in the present disclosure do not indicate any order, quantity or importance, but are only configured to distinguish different components. "Include" or "comprise" and similar words mean that the elements or objects appearing before the word cover the elements or objects listed after the word and their equivalents, without excluding other elements or objects. "Connect" or "connected" and similar words are not limited to physical or mechanical connections, but can include electrical connections, whether direct or indirect. "Up", "down", "left", "right" and the like are only configured to indicate relative positional relationships. When the absolute position of the described object changes, the relative positional relationship may also change accordingly.

It will be understood that when an element such as a layer, film, region, or substrate is referred to as being "on" or "under" another element, it can be "directly on" or "under" the other element or intervening elements may be present.

In the description of the above embodiments, specific features, structures, materials or characteristics may be combined in a suitable manner in any one or more embodiments or examples.

The above is only a specific embodiment of the present disclosure, but the protection scope of the present disclosure is not limited thereto. Any person skilled in the art who is familiar with the technical field can easily think of changes or substitutions within the technical scope disclosed in the present disclosure, which should be included in the protection scope of the present disclosure. Therefore, the protection scope of the present disclosure should be based on the protection scope of the claims.

What is claimed is:

1. A display processing device, applied to a display device, wherein a display area of the display device comprises color sub-pixels and white sub-pixels, and the display processing device comprises:

an acquisition module, configured to acquire, when the display device is in a video playback state, a first value of at least one first parameter of a preset area of the display area, wherein the first parameter corresponds to a driving transistor of a pixel driving circuit of the preset area, and the value of the first parameter is proportional to a threshold voltage of the corresponding driving transistor; and acquire a second value of each first parameter after a first preset time period;

a determination module, configured to determine a target area according to a difference between the second value and the first value, wherein the difference of at least part of the first parameters of the target area is greater than a first preset threshold; and the processing module, configured to reduce a brightness of the color sub-pixels in the target area, wherein the processing module is further configured to increase the brightness of the white sub-pixel in the target area while reducing the brightness of the color sub-pixels in the target area.

2. The display processing device according to claim 1, wherein the target area satisfies at least one of the following:

all first parameters in the target area are greater than a first preset threshold;

a difference of part of the first parameters in the target area is greater than a first preset threshold;

all first parameters in the target area are greater than a first preset threshold.

3. The display processing device according to claim 1, wherein the pixel driving circuit comprises a data writing circuit, a driving circuit, an external control compensation circuit and a storage capacitor, the data writing circuit comprises a first transistor, a gate of the first transistor is connected to a first gate line, a first electrode of the first transistor is connected to a data line, and a second electrode of the first transistor is connected to a first node;

an external compensation control circuit comprises a second transistor, a gate of the second transistor is connected to a second gate line, a first electrode of the second transistor is connected to a compensation control line, and a second electrode of the second transistor is connected to a second node;

the driving circuit comprises a driving transistor, a gate of the driving transistor is connected to the first node, a first electrode of the driving transistor is connected to a high level signal line, and a second electrode of the driving transistor is connected to the second node;

the first plate of the storage capacitor is connected to the first node, and a second plate of the storage capacitor is connected to the second node;

the display stage of the display device comprises four stages:

in a first stage, a high potential electrical signal is input to the first gate line and the second gate line;

in a second stage, a low potential electric signal is input to the first gate line, a high potential electric signal is input to the second gate line, and the potential of the electric signal input to the compensation control line is gradually increased;

in a third stage, a low potential electrical signal is input to the first gate line, a high potential electrical signal is input to the second gate line, and a high potential electrical signal is input to the compensation control line;

in a fourth stage, a high potential electrical signal is input to the first gate line and the second gate line, and a low potential electrical signal is input to the compensation control line;

the acquisition module is further configured to acquire the voltage signal of the second node in the third stage, and convert the voltage signal into the value of the first parameter.

4. The display processing device according to claim 1, wherein the display area is divided into a plurality of sub-areas arranged in an array, and the preset area comprises at least one of the sub-areas.

5. The display processing device according to claim 4, wherein the preset area comprises four sub-areas located at the corners of the display area.

6. The display processing device according to claim 1, wherein the processing module is further configured to repeat the step of obtaining the difference after reducing the brightness of the colored sub-pixels of the target area, and restore the brightness of the colored sub-pixels of the target area when the difference is less than a second preset threshold value for n consecutive times, wherein n is an integer greater than 2, and the second preset threshold value is less than the first preset threshold value.

7. The display processing device according to claim 1, wherein the processing module is further configured to reduce the brightness of the colored sub-pixels of the target area and increase the brightness of the white sub-pixels of the target area, and then after a second preset time period, reduce the brightness of the colored sub-pixels and/or white sub-pixels of the target area, and repeat the step of obtaining the difference, and restore the brightness of the colored sub-pixels and/or white sub-pixels of the target area when the difference is less than a second preset threshold value for n consecutive times, wherein n is an integer greater than 2, and the second preset threshold value is less than the first preset threshold value.

8. The display processing device according to claim 1, wherein the processing module is further configured to, after reducing the brightness of the colored sub-pixels of the target area and increasing the brightness of the white sub-pixels of the target area, cyclically execute the steps of reducing and increasing the brightness of the colored sub-pixels and/or white sub-pixels of the target area after a second preset time period, and repeat the step of obtaining the difference, and restore the brightness of the colored sub-pixels and/or white sub-pixels of the target area when the difference is less than a second preset threshold value for n consecutive times, wherein n is an integer greater than 2, and the second preset threshold value is less than the first preset threshold value.

9. A display device comprising the display processing device according to claim 1.

10. A display processing method, applied to a display device, wherein a display area of the display device comprises color sub-pixels and white sub-pixels, and the method comprises:

when the display device is in a video playback state, obtaining a first value of at least one first parameter of a preset area of the display area, wherein the first parameter corresponds to a driving transistor of a pixel driving circuit of the preset area, and the value of the first parameter is proportional to a threshold voltage of the corresponding driving transistor;

after a first preset time period, obtaining a second value of each first parameter;

determine a target area according to a difference between the second value and the first value, wherein the difference of at least part of the first parameters of the target area is greater than a first preset threshold; and the brightness of the color sub-pixels in the target area is reduced, wherein while reducing the brightness of the color sub-pixels in the target area, the method further comprises the brightness of the white sub-pixels in the target area is increased.

11. The display processing method according to claim 10, wherein the target area satisfies at least one of the following:

all first parameters in the target area are greater than a first preset threshold;

the difference of part of the first parameters in the target area is greater than a first preset threshold;

all first parameters in the target area are greater than a first preset threshold.

12. The display processing method according to claim 10, wherein the pixel driving circuit comprises a data writing circuit, a driving circuit, an external control compensation circuit and a storage capacitor, the data writing circuit includes a first transistor, a gate of the first transistor is connected to a first gate line, a first electrode of the first transistor is connected to a data line, and a second electrode of the first transistor is connected to a first node;

an external compensation control circuit comprises a second transistor, a gate of the second transistor is connected to a second gate line, a first electrode of the second transistor is connected to a compensation control line, and a second electrode of the second transistor is connected to a second node;

the driving circuit comprises a driving transistor, a gate of the driving transistor is connected to the first node, a first electrode of the driving transistor is connected to a high level signal line, and a second electrode of the driving transistor is connected to the second node;

the first plate of the storage capacitor is connected to the first node, and the second plate of the storage capacitor is connected to the second node;

the display stage of the display device includes four stages:

in a first stage, a high potential electrical signal is input to the first gate line and the second gate line;

in a second stage, a low potential electric signal is input to the first gate line, a high potential electric signal is input to the second gate line, and the potential of the electric signal input to the compensation control line is gradually increased;

in a third stage, a low potential electrical signal is input to the first gate line, a high potential electrical signal is input to the second gate line, and a high potential electrical signal is input to the compensation control line;

in a fourth stage, a high potential electrical signal is input to the first gate line and the second gate line, and a low potential electrical signal is input to the compensation control line;

wherein the obtaining the value of at least one first parameter of the preset area of the display area comprises:

in the third stage, acquiring a voltage signal of the second node, and converting the voltage signal into a value of the first parameter.

13. The display processing method according to claim 10, wherein the display area is divided into a plurality of sub-areas arranged in an array, and the preset area comprises at least one of the sub-areas.

14. The display processing method according to claim 13, wherein the preset area comprises four sub-areas located at the corners of the display area.

15. The display processing method according to claim 13, wherein the length of the sub-region does not exceed one quarter of the length of the display region, and the width of the sub-region does not exceed one quarter of the width of the display region.

16. The display processing method according to claim 10, wherein after reducing the brightness of the color sub-pixels in the target area, the method further comprises:

repeating the step of obtaining the difference, and when the difference is less than a second preset threshold value for n consecutive times, restore the brightness of the color sub-pixel of the target area, where n is an integer greater than 2, and the second preset threshold value is less than the first preset threshold value.

17. The display processing method according to claim 10, wherein after reducing the brightness of the color sub-pixels in the target area and increasing the brightness of the white sub-pixels in the target area, the method further comprises:

after a second preset time period, reducing the brightness of the colored sub-pixels and/or white sub-pixels of the target area, and repeating the step of obtaining the difference;

when the difference is less than a second preset threshold value for n consecutive times, the brightness of the colored sub-pixels and/or white sub-pixels of the target area is restored, where n is an integer greater than 2, and the second preset threshold value is less than the first preset threshold value.

18. The display processing method according to claim 10, wherein after reducing the brightness of the color sub-pixels in the target area and increasing the brightness of the white sub-pixels in the target area, the method further comprises:

after a second preset time period, cyclically performing the steps of reducing and increasing the brightness of the colored sub-pixels and/or white sub-pixels of the target are, and repeating the step of obtaining the difference; wherein when the difference is less than a second preset threshold value for n consecutive times, the brightness of the colored sub-pixels and/or white sub-pixels of the target area is restored, where n is an integer greater than 2, and the second preset threshold value is less than the first preset threshold value.

19. A display processing device, applied to a display device, wherein a display area of the display device comprises color sub-pixels and white sub-pixels, and the display processing device comprises:

an acquisition module, configured to acquire, when the display device is in a video playback state, a first value of at least one first parameter of a preset area of the display area, wherein the first parameter corresponds to a driving transistor of a pixel driving circuit of the preset area, and the value of the first parameter is proportional to a threshold voltage of the corresponding driving transistor; and acquire a second value of each first parameter after a first preset time period;

a determination module, configured to determine a target area according to a difference between the second value and the first value, wherein the difference of at least part of the first parameters of the target area is greater than a first preset threshold; and the processing module, configured to reduce a brightness of the color sub-pixels in the target area, wherein:

the pixel driving circuit comprises a data writing circuit, a driving circuit, an external control compensation circuit and a storage capacitor, the data writing circuit comprises a first transistor, a gate of the first transistor is connected to a first gate line, a first electrode of the first transistor is connected to a data line, and a second electrode of the first transistor is connected to a first node;

an external compensation control circuit comprises a second transistor, a gate of the second transistor is connected to a second gate line, a first electrode of the second transistor is connected to a compensation control line, and a second electrode of the second transistor is connected to a second node;

the driving circuit comprises a driving transistor, a gate of the driving transistor is connected to the first node, a first electrode of the driving transistor is connected to a high level signal line, and a second electrode of the driving transistor is connected to the second node;

the first plate of the storage capacitor is connected to the first node, and a second plate of the storage capacitor is connected to the second node; and the display stage of the display device comprises four stages:

in a first stage, a high potential electrical signal is input to the first gate line and the second gate line;

in a second stage, a low potential electric signal is input to the first gate line, a high potential electric signal is input to the second gate line, and the potential of the electric signal input to the compensation control line is gradually increased;

in a third stage, a low potential electrical signal is input to the first gate line, a high potential electrical signal is input to the second gate line, and a high potential electrical signal is input to the compensation control line;

in a fourth stage, a high potential electrical signal is input to the first gate line and the second gate line, and a low potential electrical signal is input to the compensation control line; and the acquisition module is further configured to acquire the voltage signal of the second node in the third stage, and convert the voltage signal into the value of the first parameter.

20. A display device comprising the display processing device according to claim 19.

* * * * *